United States Patent
Hussain

(10) Patent No.: US 8,026,627 B2
(45) Date of Patent: Sep. 27, 2011

(54) POWERED DEVICE FOR POWER OVER ETHERNET SYSTEM WITH INCREASED CABLE LENGTH

(75) Inventor: Asif Hussain, Tustin, CA (US)

(73) Assignee: Broadcom Corporation, Irvine, CA (US)

(*) Notice: Subject to any disclaimer, the term of this patent is extended or adjusted under 35 U.S.C. 154(b) by 73 days.

(21) Appl. No.: 11/987,644

(22) Filed: Dec. 3, 2007

(65) Prior Publication Data

US 2008/0315682 A1    Dec. 25, 2008

Related U.S. Application Data

(60) Provisional application No. 60/929,352, filed on Jun. 22, 2007.

(51) Int. Cl.
H04B 3/04    (2006.01)
(52) U.S. Cl. .................. 307/2; 307/1; 307/3
(58) Field of Classification Search ............ 307/1–3
See application file for complete search history.

(56) References Cited

U.S. PATENT DOCUMENTS

| | | | |
|---|---|---|---|
| 6,125,048 A * | 9/2000 | Loughran et al. | 363/78 |
| 7,170,194 B2 | 1/2007 | Korcharz et al. | |
| 7,404,091 B1 * | 7/2008 | Gere | 713/300 |
| 2005/0132240 A1 | 6/2005 | Stineman, Jr. et al. | |
| 2005/0262364 A1 | 11/2005 | Diab et al. | |
| 2008/0172564 A1 | 7/2008 | Diab et al. | |
| 2008/0276104 A1 | 11/2008 | Hussain et al. | |
| 2011/0004773 A1 | 1/2011 | Hussain et al. | |

OTHER PUBLICATIONS

National Semiconductor News Release dated Jan. 16, 2006, "National Semiconductor Introduces Industry's First Single-Chip, Power over Ethernet Device Controller Designed for Low-Voltage Auxiliary Power Sources", obtained from http://www.national.com/news on Jun. 23, 2009.*
Maxim MAX5941A/MAX5941B, Maxim IEEE 802.af-Compliant Power-Over-Ethernet Interface/PWM Controller for Power Devices, 19-3069; Rev 0; Oct. 2003, copyright 2003, Maxim Integrated Products, Sunnyvale, CA. pp. 1-24.*
Texas Instruments IEEE 802.3af POE Powered Device Controllers, SLVS525A—Apr. 2004—Revised Sep. 2004, TPS2375,2376,2377. Copyright 2004, Texas Instruments Incorporated, Dallas Texas.pp. 1-21.*
National Semiconductor LM5071 Power Over Ethernet PD Controller with Auxiliary Power Interface, Apr. 2006, DS201684. Copyright 2006, National Semiconductor Corporation. pp. 1-18.*

* cited by examiner

*Primary Examiner* — Fritz M Fleming
(74) *Attorney, Agent, or Firm* — Sterne, Kessler, Goldstein & Fox, P.L.L.C.

(57) ABSTRACT

A Powered Device (PD) in a Power Over Ethernet system that supports increased cable lengths of more than 100 m is provided herein. The proposed PD design requires no modifications at the PSE side. Embodiments include example modifications of IEEE 802.3af PD system rules, including example modifications of PD classification and port voltage ranges to enable increased cable length PoE.

22 Claims, 10 Drawing Sheets

| Cable Length | Min Vclass | Max Vclass | Comments |
|---|---|---|---|
| 100m | 14.5v | 20.5v | Per IEEE802.3af |
| 350m | 11.9v | 20.5v | RCable=70 Ohm |
| 500m | 10.4v | 20.5v | Rcable=100 Ohm |

FIG. 3

| Cable Length | Min Vclass | Max Vclass | Comments |
|---|---|---|---|
| 100m | 14.5v | 20.5v | Per IEEE802.3af |
| 350m | 13.05v | 20.5v | RCable=70 Ohm |
| 500m | 12v | 20.5v | Rcable=100 Ohm |

FIG. 4

| Cable Length | Min Vport | Max Vport | Comments |
|---|---|---|---|
| 100m | 36v | 57v | Per IEEE802.3af |
| 350m | 18.5v | -- | RCable=70 Ohm |
| 500m | 8v | -- | Rcable=100 Ohm |

FIG. 5

| Cable Length | Power Loss | PD to support | Comments |
|---|---|---|---|
| 100m | 2.45W | 12.95W | Per IEEE802.3af |
| 350m | 8.57W | 12.95W | RCable=70 Ohm |
| 500m | 12.25W | 12.95W | Rcable=100 Ohm |

FIG. 6

POWERED DEVICE FOR POWER OVER ETHERNET SYSTEM WITH INCREASED CABLE LENGTH

CROSS-REFERENCE TO RELATED APPLICATIONS

The present application claims the benefit of U.S. Provisional Patent Application No. 60/929,352, filed Jun. 22, 2007, which is incorporated herein by reference in its entirety.

The present application is related to U.S. patent application Ser. No. 11/984,621, filed Nov. 20, 2007, which claims the benefit of U.S. Provisional Patent Application No. 60/924,141, filed May 1, 2007, both of which are incorporated herein by reference in their entireties.

BACKGROUND OF THE INVENTION

1. Field of the Invention

The present invention relates generally to Power over Ethernet (PoE), and more particularly to a PD controller for PoE systems with increased cable length.

2. Background Art

Ethernet communications provide high speed communications between data terminals.

Power over Ethernet (PoE) systems enable power transmission over the same transmission lines that carry data in an Ethernet. Generally, power is generated at a Power Source Equipment (PSE) side of the PoE system and is carried over the data transmission lines to a Powered Device (PD) side of the PoE System.

A PSE controller is typically used at the PSE side to enable power management functions of the PD. For example, a PSE controller may be used to detect whether a valid PD device is active and to manage power flow to the PD. Further, at either side of a PoE system, a transceiver physical layer (PHY) is available to transmit and receive data over the transmission lines.

Current IEEE compliant PoE systems support cable lengths up to approximately 100 meters only. There is a need therefore for improved PoE systems that support greater cable lengths.

BRIEF SUMMARY OF THE INVENTION

Increased cable length Power over Ethernet (PoE) methods and systems are provided herein.

Embodiments can be designed for compliance with IEEE 802.3af, future IEEE 802.3at, or legacy PoE standards.

Embodiments include a PD controller design enabled for increased length PoE without modification on the existing PSE design.

Embodiments include example modifications of IEEE 802.3af PD system rules revised for increased cable length applications, including example modifications of PD port voltage ranges.

Embodiments include PDs supporting increased length PoE.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 3 illustrates required PD classification voltage ranges in example increased length PoE systems.

FIG. 4 illustrates required PSE classification voltage ranges in example increased length PoE systems.

FIG. 5 illustrates required PSE post start up voltage ranges in example increased length PoE systems.

FIG. 6 illustrates maximum PD power requirements and cable power loss in example increased length PoE systems.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Overview

Current IEEE 802.3af compliant PoE systems support cable lengths up to approximately 100 meters only. There is a need therefore for improved PoE systems that support greater cable lengths.

Increased cable length Power over Ethernet (PoE) methods and systems are provided herein. Embodiments can be designed to support IEEE 802.3af, future IEEE 802.3at, and/or legacy PoE standards. Embodiments include PD designs enabled for increased length PoE.

Introduction

Figure 1:
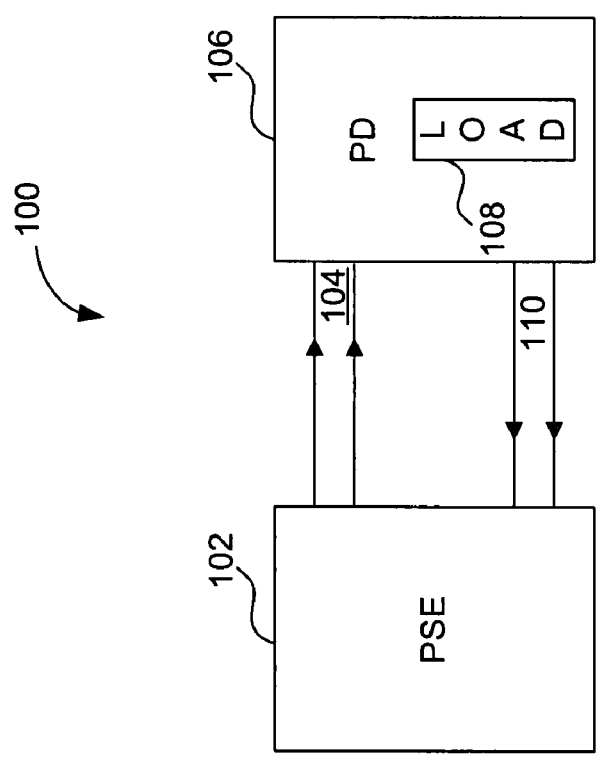
FIG. 1 is an overview of a Power over Ethernet (PoE) system.

FIG. 1 illustrates a high level diagram of a conventional Power over Ethernet (PoE) system 100 that provides DC power over a common data communications medium. Referring to FIG. 1, power source equipment 102 provides DC power over conductors 104, 110 to a powered device (PD) 106 having a representative electrical load 108. Accordingly, the power transfer between the PSE 102 and the PD 106 occurs simultaneously with the exchange of high speed data over the conductors 104, 110. In one example, the PSE 102 when used with a switching and PHY chip is a data switch having multiple ports that is communicating with one or more PD devices, such as Internet phones, wireless access points, etc.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 1 Gigabit Ethernet. In 10/100 Ethernet, only two of the four pairs carry data communications, and the other two pairs of conductors are unused. Herein, conductor pairs may be referred to as Ethernet cables or communication links or structured cabling for ease of discussion. The conductor pairs may be CAT-5 cable for example. Alternatively, the conductor pairs may be CAT-3, CAT-5e, CAT-6, CAT-6a, or CAT-7 cable.

Figure 2:
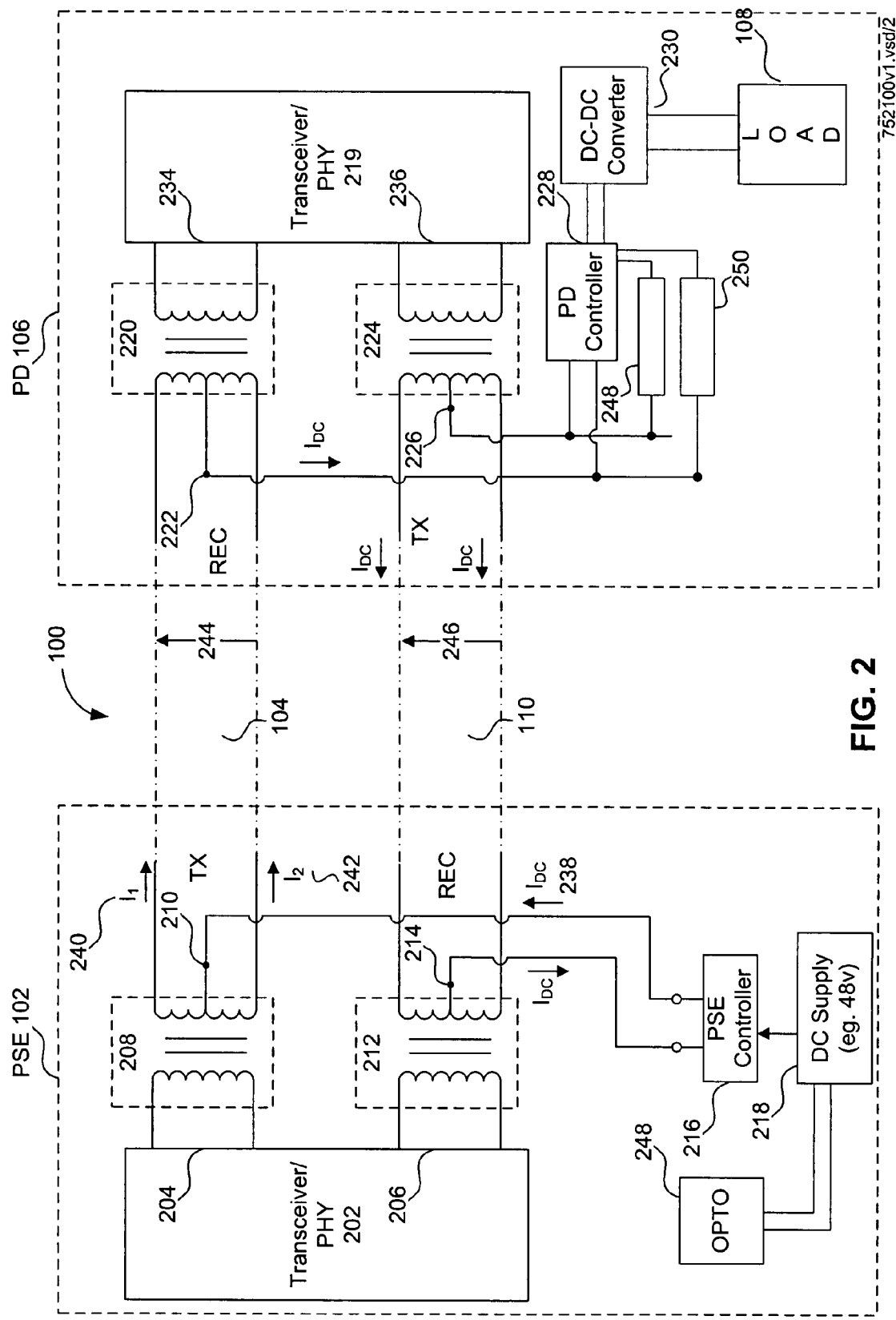
FIG. 2 is a more detailed view of a PoE system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs.) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive to large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC output voltage is applied across the respective center taps (e.g. 210, 214) of the transformers 208 and 210 on the conductor side of the transformers. An example DC output voltage for the DC supply 218 is 48 volts, but other voltages could be used depending on the voltage/power requirements of the PD 106.

The PSE 102 further includes a PSE controller 216 which performs the power management functions based on the dynamic needs of the PD 106. More specifically, the PSE controller 216 measures the voltage, current, and temperature, etc so as to characterize the power requirements of the PD 106.

Further, the PSE controller 216 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. The IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 side includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (e.g. 3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 216 will recognize the PD as a valid PoE device, and be able to classify its power requirements. FIG. 2 also illustrates a signature resistor 248 and a classification resistor 250 connected to PD 106. Signature resistor 248 is used to validate the PD 106, and the classification resistor 250 is used for classifying PD 106 and to limit current for classification.

During ideal operation, a direct current (IDC) 238 flows from the PSE Controller 216 through the first center tap 210, and divides into a first current (I1) 240 and a second current (I2) 242 that are carried over conductor pair 104. The first current (I1) 240 and the second current (I2) 242 then recombine at the third center tap 222 to reform the direct current (IDC) 238 so as to power PD 106. On return, the direct current (IDC) 238 flows from PD 106 through the fourth center tap 226, and divides for transport over conductor pair 110. The return DC current recombines at the second center tap 214, and returns to the DC power supply 218.

As discussed above, data transmission between the PSE 102 and the PD 106 occurs simultaneously with the power as described above. Accordingly, a first communication signal 244 and/or a second communication signal 246 are simultaneously differentially carried via the conductor pairs 104 and 110 between the transceivers or PHY of PSE 102 and the PD 106. It is important to note that the communication signals 244 and 246 are differential signals that ideally are not effected by the DC power transfer described above. However, the signaling used by the PSE controller is based on common mode signaling so it does not interfere with data transmission.

In order to conduct its management and control of PD 106, PSE 102 analyzes certain characteristics of PD 106, and the system as a whole, based on measurements taken at PD 106. Based on those characteristics, PSE 102 can determine certain attributes of PD 106 as well as attributes of the system. Example attributes determined by PSE 102 can include, but are not limited to, the following: valid device detection, power classification, AC disconnect information, short circuit detection, PD load variations, various current measurements, overload conditions, and inrush conditions.

Increased Length Power Over Ethernet (PoE) System

Current IEEE compliant PoE systems support cable lengths up to approximately 100 meters only. As such, to support greater cable lengths, modified PSE and PD interfaces are needed.

In the teachings herein, several example embodiments for enabling increased length PoE systems are provided. These embodiments are provided for the purpose of illustration and are not limiting of the scope of the present invention. Further, embodiments will be described with respect to IEEE compliant systems (e.g., IEEE 802.3af and IEEE 802.3at). However, embodiments of the present invention are not limited to IEEE compliant systems and can be extended to legacy PoE systems having their own defined system rules.

One problem that is encountered in supporting increased length IEEE compliant PoE systems includes the increased resistance of the Ethernet cable (e.g., a CAT-5 cable) that connects the PSE and the PD. Indeed, IEEE compliant PSEs are designed to operate with a CAT-5 cable having a maximum length of approximately 100 meters. As such, IEEE compliant PSEs are designed to compensate for a maximum cable resistance of approximately 20 Ohms when supporting IEEE compliant PDs in current PoE systems. This compensation includes compensating for the voltage drops that could occur across the 20 Ohms resistance during each of the different operational phases (e.g., detection, classification, etc.) of the PoE system.

Accordingly, when the cable length (and correspondingly the cable resistance) is increased, compliance with IEEE requires modification of system rules at the PSE to enable the same operational voltages at the PD.

Examples of modification of PSE systems rules according to an embodiment of the present invention will now be described with respect to FIGS. 3-6. These examples are provided with respect to two exemplary PoE embodiments having increased cable length of 350 meters. These examples are provided for the purpose of illustration and are not limiting of the scope of the present invention. As would be understood by a person skilled in the art based on the teachings herein, these examples can be extended to support PoE systems having different cable lengths depending upon the PSE port voltages and PD class and load currents.

FIG. 3 illustrates PD classification voltage ranges for two exemplary PoE embodiments with increased cable length. FIG. 3 uses Class 4 as an example for which maximum current is up to 51 mA. FIG. 3 also illustrates the required PD classification voltage range in a typical IEEE compliant PoE system. This range according to IEEE 802.3af should be between a minimum of 14.5 volts and a maximum of 20.5 volts on the PD side. It is noted that this required classification voltage range is specified based on a maximum cable length of 100 meters (or equivalently a 20 Ohms resistance) to provide valid classification voltages at the PD (typically, a valid classification voltage at the PD is between 14.5 volts and 20.5 volts).

As such, when the cable length is increased, the PD classification voltage range needs to be modified to compensate for the increased cable resistance. In an embodiment, this includes decreasing the minimum end of the classification voltage range according to the maximum possible added voltage drop due to the increase in cable resistance. In other words, this includes decreasing the minimum end of the classification voltage range by the added voltage drop due to the maximum possible current during the classification phase of an IEEE compliant PoE system.

Table 33-4 (not shown) of the IEEE 802.3af standard specifies the maximum current during classification to be equal to 51 milliamps in a PoE system that supports PDs of class 0 to 4. Accordingly, the resulting classification voltage ranges for the exemplary PoE systems with cable length of 350 and 500 meters are as shown in FIG. 3. For example, for a cable length of 350 meters, the minimum end of the classification voltage range at the PD is equal to 15.5−(51 milliamps×70 Ohms) ≈11.93 volts. Similarly, for a cable length of 500 meters, the minimum end of the classification voltage range at the PSE is equal to 15.5−(51 milliamps×100 Ohms)≈10.4 volts.

It is noted, however, that current IEEE compliant PoE systems do not allow the usage of PDs of class 4, which is specified as "reserved" in the IEEE 802.3af standard. To be IEEE802.3af compliant, a PSE therefore only requires support of PDs of class 0 to 3. As such, the maximum current during classification with respect to which added voltage drops need to be calculated is only 35 milliamps, instead of 51 milliamps when class 4 is used. Based on that, compliance with IEEE can also be achieved using the PD classification voltage ranges illustrated in FIG. 4, which are calculated according to a maximum current during classification of 35 milliamps.

It is noted that in other aspects classification in increased length PoE systems remain substantially similar to classification in current PoE systems. For example, the classification phase duration remains as specified in IEEE 802.3af (less than or equal to 75 milliseconds). Also, the classification current limit (less than or equal to 100 milliamps) remains as specified in IEEE 802.3af. Similarly, the detection phase remains as specified in IEEE 802.3af, with the increased cable resistance added to the PD resistor signature and compensated for at the PSE.

As with classification voltage ranges, however, post start up voltage ranges need to be modified to enable increased cable length IEEE compliant PDs. FIG. 5 illustrates PD post start up voltage ranges for the two exemplary PoE embodiments with increased cable length. FIG. 5 also illustrates the required PD post start up voltage range in a typical IEEE compliant PoE system. This range according to IEEE 802.3af should be between a minimum of 36 volts and a maximum of 57 volts. As illustrated, this required post start up voltage range is specified based on a maximum cable length of 100 meters (or equivalently a 20 Ohms resistance) to provide valid post start up voltages at the PD (typically, a valid post start up voltage at the PD is between 36 volts and 57 volts).

In an embodiment, the minimum end of the PD post start up voltage range is decreased according to the maximum possible added voltage drop due to the increase in cable resistance.

IEEE 802.3af specifies the maximum load current during post start up to be equal to 350 milliamps. Accordingly, the resulting PSE post start up voltage ranges are as shown in FIG. 5. For example, for a cable length of 350 meters, the minimum end of the start up voltage range is equal to 44 v−(350 milliamps×70 Ohms)−1 v (approximate diode voltage drop)=18.5 volts. Similarly, for a cable length of 500 meters, the minimum end of the start up voltage range is equal to 44 v−(350 milliamps×100 Ohms)−1 v (approximate diode voltage drop)=8 volts, where 44 v is the minimum port voltage at PSE side. These exemplary PD start up voltage ranges guarantee valid post start up port voltages at the PD. Since IEEE802.3af allows a PSE port voltage range of 44 v-57 v, it would be recommended to use a higher value of port voltage at the PSE side (e.g., 56 v). This will ensure a minimum power delivery of 10.67 W at the PD side for a cable length of 350 m.

In addition to ensuring valid port voltages at the PD, IEEE compliance also necessitates compliance with power requirements at the PD. IEEE 802.3af specifies a maximum power level of 12.95 Watts at the PD for PDs of class 0 to 3. With a cable length of 100 meters, this implies that the PD should be able to support a maximum of 12.95 Watts, as approximately a maximum of 2.45 Watts could dissipate in the cable (7 volts×350 milliamps=2.45 Watts) due to cable resistance. However, with increased cable length it may not be possible to support the maximum 12.95 W at the PD side due to increased power dissipation in the cable.

With greater cable length, larger power dissipation in the cable will occur. Consequently, the PSE will be required to support greater power outputs. This is shown in FIG. 6, which illustrates required PD power requirements and cable power loss in example increased length PoE systems. For example, for a cable length of 350 meters, the PSE will be required to support 21.52 Watts as a maximum of 8.57 Watts (24.5 volts× 350 milliamps=8.57 Watts) could dissipate in the cable. Similarly, for a cable length of 500 meters, the PSE will be required to support 25.2 Watts as a maximum of 12.25 Watts (35 volts×350 milliamps=12.25 Watts) could dissipate in the cable due to cable resistance. This basically requires increased port voltage from the PSE side. Since the current IEEE802.3af standard supports a voltage range of 44 v-57 v, a port voltage at the high end (e.g., 57 v) should be preferably used. However, other port voltage values can also be used. If the port voltage at PSE side is not increased, the power delivered to the PD will be reduced due to the dissipation on the increased cable length.

Note that similar cable power loss figures (8.57 Watts and 12.25 Watts) as described above are currently being studied by the IEEE 802.3at task force in approving a cable plant that propose supporting up to 720 milliamps, which approximates a cable loss of 10.3 Watts for a cable of length 100 meters.

The above described example embodiments describe PD IEEE compliance requirements to enable increased length PoE systems. As noted above, similar PD requirements can be created for increased length PoE systems that comply with legacy PoE standards. These PD requirements ensure that the PD works properly in view of the maximum possible cable current.

Figure 7:
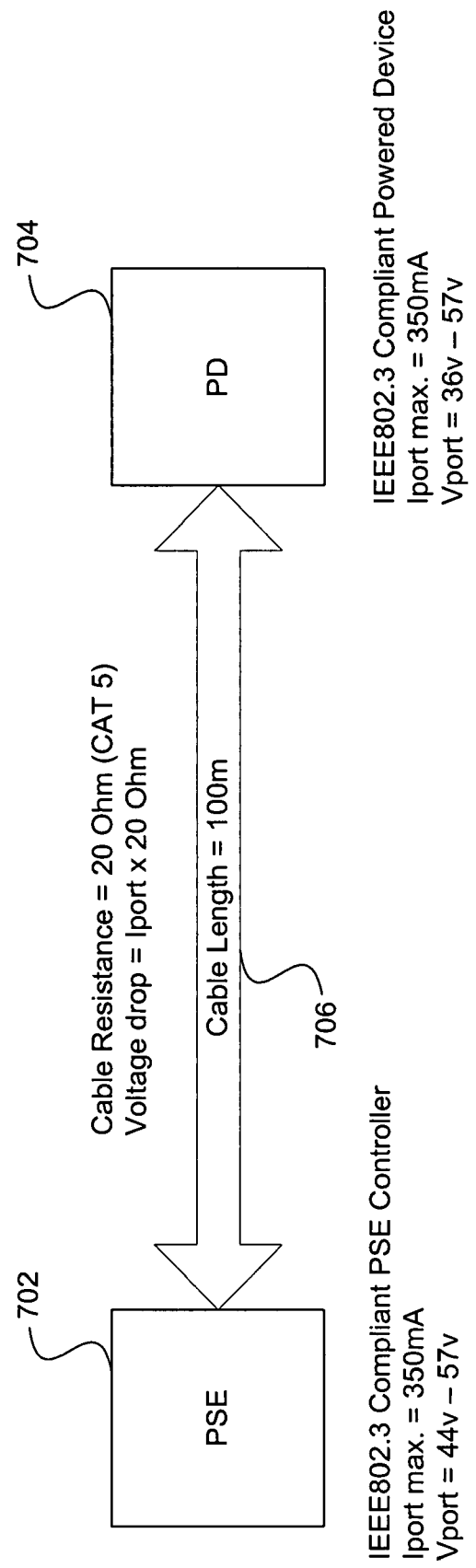
FIG. 7 illustrates an IEEE compliant PoE system.

FIG. 7 illustrates an IEEE compliant PoE system 700. PoE system 700 includes an IEEE compliant PSE 702 and an IEEE compliant PD 704, connected by a CAT-5 cable 706 having a length of 100 meters.

A maximum compliant current of 350 milliamps is allowed over cable 706 during the post start up phase. As such, a maximum voltage drop of 7 volts can occur over cable 706. Accordingly, PSE 702 is required to support a minimum port voltage of 44 volts to enable a minimum port voltage of 36 volts at PD 704 (a drop of approximately 1 volt occurs across a diode prior to the PD input port).

Note, however, that the required maximum PSE port voltage is only 57 volts, which is also approximately the maximum voltage supported by current IEEE compliant PD processes. As such, notwithstanding the value of the cable current (or equivalently the voltage drop across cable 706), the PD port voltage will always be within an allowable maximum voltage of the PD process.

Figure 8:
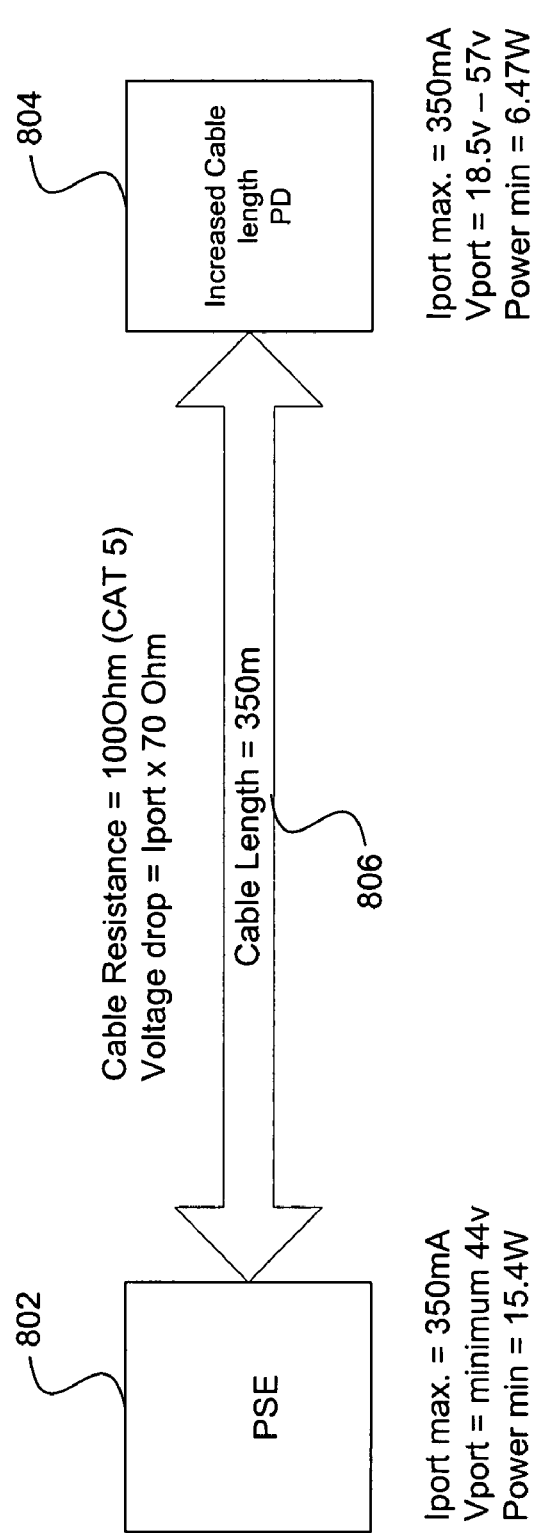
FIG. 8 illustrates an example increased length PoE system.

FIG. 8 illustrates an example increased length PoE system 800. PoE system 800 includes a PSE 802 and PD 804, connected by a CAT-5 cable 806 having a length of 350 meters. This example uses a PSE minimum port voltage of 44 v.

PSE 802 is enabled to support increased cable length up to 350 meters. For example, PSE 802 supports a minimum port voltage of 44 volts during the start up phase to provide a minimum port voltage of 18.5 volts at PD 804 (a maximum voltage drop of 24.5 volts occurs across cable 806).

PD 804 is an increased cable length PD with a process that supports voltages up to 57 volts.

Note that the minimum port voltage at PD 804 (18.5 volts) is less than the minimum supported voltage of an IEEE802.3af compliant PD (36 v-57 v). Therefore, adjustment in PD design is needed for PD 804.

Figure 9:
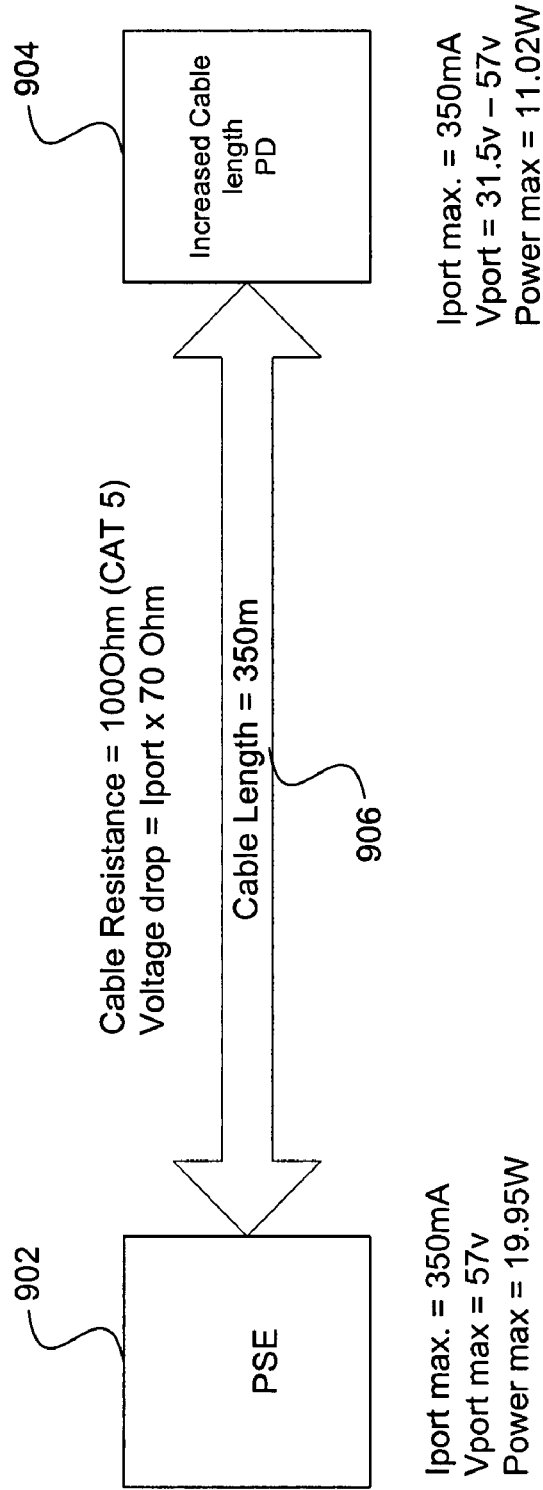
FIG. 9 illustrates an example increased length PoE system.

FIG. 9 illustrates an example increased length PoE system 900. PoE system 900 includes a PSE 902 and PD 904, connected by a CAT-5 cable 906 having a length of 350 meters. This example uses a PSE maximum port voltage of 57 v.

PSE 902 is enabled to support increased cable length up to 350 meters. For example, PSE 902 supports a maximum port voltage of 57 volts during the start up phase to provide a minimum port voltage of 31.5 volts at PD 904 (a maximum voltage drop of 24.5 volts occurs across cable 906).

PD 904 is an increased cable length PD with a process that supports voltages up to 57 volts.

Note that the minimum port voltage at PD 904 (31.5 volts) is less than the minimum supported voltage of an IEEE802.3af compliant PD (36 v-57 v). Therefore, adjustment in PD design is needed for PD 904.

Note that power class at PD side is used as a factor to calculate the voltage drop across the cable, as different power classes (0-3) will cause different voltage drops across the cable due to different load currents. Accordingly, there is a need to detect the PD power class at the PD side in order to calculate the $V_{on}/V_{off}$ voltage at the PD. The PD $V_{on}$ voltage as per IEEE802.3af is 42 v at maximum. The PD $V_{off}$ voltage as per IEEE802.3af is 30 v at minimum. These levels of $V_{on}/V_{off}$ are defined based on a 100 m cable length, accounting for only 7 v of cable drop. Therefore, to accommodate increased cable lengths and increased cable voltage drops, these levels need to be adjusted.

One solution according to the present invention is to design the PD chip such that it is capable of detecting its own power class signature. Accordingly, the PD chip can calculate its own $V_{on}$ and $V_{off}$ levels.

Figure 10:
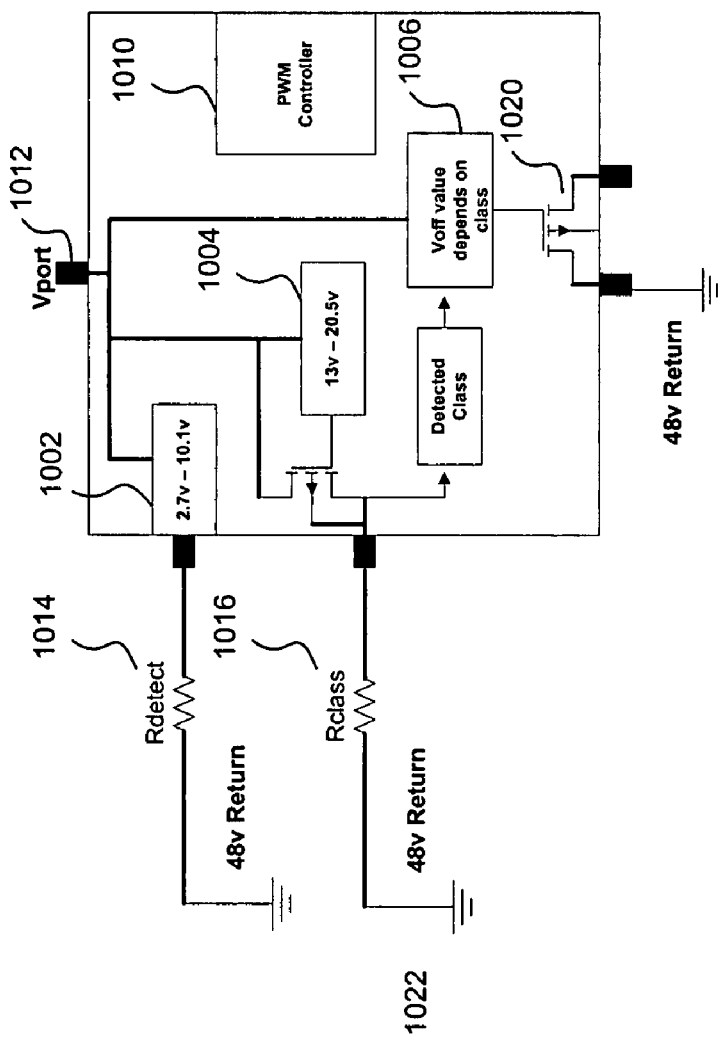
FIG. 10 illustrates an example powered device (PD) chip usable in an increased length PoE system.

FIG. 10 illustrates an example powered device (PD) chip 1000 usable in an increased length PoE system. Example PD chip 1000 includes a plurality of circuits 1002, 1004, 1006, and 1008 and a Pulse Width Modulation (PWM) Controller 1010.

Circuits 1002, 1004, 1006, and 1008 are each connected to a port voltage $V_{port}$ 1012 of PD chip 1000. Each of these circuits 1002, 1004, 1006, and 1008 is triggered when $V_{port}$ 1012 is within the voltage range associated with it. For example, the circuit 1002 is triggered when $V_{port}$ 1012 is within the voltage range of 2.7-10.1 volts to connect $V_{port}$ 1012 through resistor $R_{detect}$ 1014 to the ground terminal. Similarly, the circuit 1004 is triggered when $V_{port}$ 1012 is within the voltage range of 13-20.5 volts to connect $V_{port}$ 1012 through resistor $R_{class}$ 1016 to the ground terminal.

Circuits 1002 and 1004 are used during the detection phase and the classification phase, respectively, which occur prior to power transfer in a PoE system. As such, $R_{detect}$ 1014 and $R_{class}$ 1016 correspond respectively to the signature resistor and the classification resistor of PD chip 1000. In example embodiment 1000, $R_{detect}$ 1014 and $R_{class}$ 1016 are shown as implemented externally to PD chip 1000. In other embodiments, $R_{detect}$ 1014 and $R_{class}$ 1016 can be integrated within PD chip 1000.

Circuit 1006 is used during the start up phase in PD chip 1000. Typically, as described above, IEEE 802.3af specifies a minimum PD shut down voltage ($V_{off}$) of 30 volts, i.e., the PD chip must shut down if $V_{port}$ 1012 is approximately 30 volts and falling. Similarly, IEEE 802.3af specifies a maximum PD turn on voltage ($V_{on}$) of 42 volts, i.e., the PD must turn on at this voltage. However, according to this embodiment of the present invention, circuit 1006 is used to calculate the $V_{on}$ and $V_{off}$ voltages of the PD based on its power class. Accordingly, an increased cable length PD is capable of calculating its own $V_{on}$ and $V_{off}$ levels based on the power class it is using.

When triggered, circuit 1006 connects $V_{port}$ 1012 through a Hot Swap MOSFET 1020 to a PD load (not shown in FIG. 10). Hot Swap MOSFET 1020 can be implemented within or outside PD chip 1000.

In current IEEE compliant PoE systems having a cable length of 100 meters or less, circuits 1002, 1004, and 1006 are sufficient for required PD operation. This is because $V_{port}$ 1012 cannot be less than 36 volts, and consequently no changes are needed to deal with $V_{port}$ 1012 levels lower than 36 volts. This does not take transients into considerations.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A Powered Device (PD) for use in a Power over Ethernet (PoE) system, comprising:
    a PD chip that receives a DC port voltage from a Power Source Equipment (PSE), said PSE connected to the PD by a cable;
    a first circuit, coupled to said DC port voltage, operable when said DC port voltage is within a detection voltage range of said PD chip to provide a detection signature of said PD chip to said PSE;
    a second circuit, coupled to said DC port voltage, operable when said DC port voltage is within a classification voltage range of said PD chip to provide a classification signature of said PD chip to said PSE; and
    a third circuit, coupled to said DC port voltage and to said second circuit, that receives said classification signature from said second circuit and that dynamically determines a turn on voltage and a turn off voltage of said PD chip based on said classification signature and a maximum voltage drop across said cable; thereby allowing said PD chip to operate when said received DC port voltage during a post startup phase is lower than an IEEE compliant minimum voltage for said post startup phase.

2. The PD of claim 1, wherein said cable is one of a CAT-3, CAT-5, CAT-5e, CAT-6, CAT-6a, or CAT-7 cable.

3. The PD of claim 1, wherein said PSE provides a voltage to said PD, said voltage is in compliance with a PoE standard.

4. The PD of claim 1, wherein said PSE provides a voltage to said PD, said voltage is in compliance with the IEEE 802.3af standard.

5. The PD of claim 1, wherein said PSE provides a voltage to said PD, said voltage is in compliance with the IEEE 802.3 at standard.

6. The PD of claim 1, wherein said PD chip supports a minimum of approximately 13 volts during a classification phase and a minimum of approximately 18.5 volts after a startup phase, thereby enabling said cable to be up to approximately 350 meters long when said PSE is an IEEE 802.3af compliant PSE and said PD is a class 0-3 PD.

7. The PD of claim 1, wherein said PD chip supports a minimum of approximately 12 volts during a classification phase and a minimum of approximately 8 volts after a startup phase, thereby enabling said cable to be up to approximately 500 meters long when said PSE is an IEEE 802.3af compliant PSE and said PD is a class 0-3 PD.

8. The PD of claim 1, wherein said PD chip supports a minimum of approximately 11.9 volts during a classification phase and a minimum of approximately 18.5 volts after a startup phase, thereby enabling said cable to be up to approximately 350 meters long when said PSE is an IEEE 802.3af compliant PSE and said PD is a class 0-4 PD.

9. The PD of claim 1, wherein said PD chip supports a minimum of approximately 10.4 volts during a classification phase and a minimum of approximately 8 volts after a startup phase, thereby enabling said cable to be up to approximately 500 meters long when said PSE is an IEEE 802.3af compliant PSE and said PD is a class 0-4 PD.

10. The PD of claim 1, wherein said second circuit dynamically detects a power class of said PD.

11. The method of claim 1, wherein said cable is at least approximately 100 meters long.

12. The PD of claim 1, wherein said PD chip supports a first minimum voltage during a classification phase and a second minimum voltage during a startup phase, wherein said first minimum voltage is lower than said second minimum voltage.

13. A Power over Ethernet (PoE) system, comprising:
    a power source equipment (PSE);
    a powered device (PD); and
    a cable that connects said PSE and said PD;
    wherein said PD receives a DC port voltage from said PSE, said PD comprising:
        a first circuit, coupled to said DC port voltage, operable when said DC port voltage is within a detection voltage range of said PD to provide a detection signature of said PD to said PSE;
        a second circuit, coupled to said DC port voltage, operable when said DC port voltage is within a classification voltage range of said PD to provide a classification signature of said PD to said PSE; and
        a third circuit, coupled to said DC port voltage and to said second circuit, that receives said classification signature from said second circuit and that dynamically determines a turn on voltage and a turn off voltage of said PD based on said classification signature and a maximum voltage drop across said cable; thereby allowing said PD to operate when said received DC port voltage during a post startup phase is lower than an IEEE compliant minimum voltage for said post startup phase; and
    wherein said PSE is in compliance with at least one of the IEEE 802.3af standard, the IEEE 802.3 at standard, and a legacy PoE standard.

14. The PoE system of claim 13, wherein said cable is one of a CAT 3, CAT5, CAT 5e, CAT 6, CAT 6a, or CAT 7 cable.

15. The PoE system of claim 13, wherein said PSE provides at least approximately 6.4 Watts at said PD when a PSE port voltage is equal to 44 volts, and at least approximately 11 Watts when said PSE port voltage is equal to 57 volts.

16. The PoE system of claim 13, wherein said cable is approximately 350 meters long.

17. The PoE system of claim 13, wherein said cable is approximately 500 meters long.

18. A method for enabling an increased reach Power over Ethernet (PoE) system, comprising:
    determining a resistance of a cable connecting a Power Source Equipment (PSE) and a Powered Device (PD) of a PoE system;
    detecting a power class of said PD; and
    determining a post start up DC port voltage range and a classification voltage range for said PD according to said power class of said PD and said cable resistance;
    configuring said PD according to said determined post start up DC port voltage range and classification voltage range; and
    receiving a voltage from said PSE at said PD;
    wherein said post start up DC port voltage range has a minimum voltage that is lower than an IEEE compliant minimum PD port voltage for a post start up phase.

19. The method of claim 18, wherein said voltage received at said PD has a minimum of approximately 13 volts during a classification phase and a minimum of approximately 18.5 volts after a startup phase, thereby enabling said cable to be up to approximately 350 meters long when said PD is a class 0-3 PD.

20. The method of claim 18, wherein said voltage received at said PD has a minimum of approximately 12 volts during a classification phase and a minimum of approximately 8 volts after a startup phase, thereby enabling said cable to be up to approximately 500 meters long when said PD is a class 0-3 PD.

21. The method of claim 18, wherein said voltage received at said PD has a minimum of approximately 11.9 volts during a classification phase and a minimum of approximately 18.5 volts after a startup phase, thereby enabling said cable to be up to approximately 350 meters long when said PD is a class 0-4 PD.

22. The method of claim 18, wherein said voltage received at said PD has a minimum of approximately 10.4 volts during a classification phase and a minimum of approximately 8 volts after a startup phase, thereby enabling said cable to be up to approximately 500 meters long when said PD is a class 0-4 PD.

* * * * *

UNITED STATES PATENT AND TRADEMARK OFFICE
CERTIFICATE OF CORRECTION

| | |
|---|---|
| PATENT NO. | : 8,026,627 B2 |
| APPLICATION NO. | : 11/987644 |
| DATED | : September 27, 2011 |
| INVENTOR(S) | : Asif Hussain |

It is certified that error appears in the above-identified patent and that said Letters Patent is hereby corrected as shown below:

Column 10, line 35, please replace "CATS" with --CAT5--.

Column 10, line 49, please replace "of said PD; and" with --of said PD;--.

Signed and Sealed this
Twenty-seventh Day of March, 2012

David J. Kappos
*Director of the United States Patent and Trademark Office*